US006987186B2

(12) United States Patent
Cole et al.

(10) Patent No.: US 6,987,186 B2
(45) Date of Patent: Jan. 17, 2006

(54) SYNTHESIS OF SMALL PARTICLE SIZE QUINACRIDONE OF BETA CRYSTAL PHASE

(75) Inventors: Damien Thurber Cole, Drexel Hill, PA (US); Suruliappa Gowder Jeganathan, Chadds Ford, PA (US); Yingxia He, Wilmington, DE (US)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 10/752,617

(22) Filed: Jan. 7, 2004

(65) Prior Publication Data

US 2004/0229057 A1 Nov. 18, 2004

Related U.S. Application Data

(60) Provisional application No. 60/443,257, filed on Jan. 28, 2003.

(51) Int. Cl.
*C07D 471/04* (2006.01)
*C07D 471/02* (2006.01)

(52) U.S. Cl. .......................................... 546/49; 546/56
(58) Field of Classification Search ................. 546/49, 546/56
See application file for complete search history.

(56) References Cited

U.S. PATENT DOCUMENTS

| 2,402,167 | A | 6/1946 | Lang et al. .............. 260/314.5 |
| 3,030,370 | A | 4/1962 | Jackson ...................... 260/279 |
| 3,275,637 | A | 9/1966 | West .......................... 260/279 |
| 3,326,918 | A | 6/1967 | West .......................... 260/279 |
| 3,386,843 | A | 6/1968 | Jaffe et al. .................. 106/288 |
| 3,607,336 | A | 9/1971 | Jaffe .......................... 106/288 |
| 4,310,359 | A | 1/1982 | Ehashi et al. ............... 106/288 |
| 4,455,173 | A | 6/1984 | Jaffe .......................... 106/288 |
| 5,084,100 | A | 1/1992 | Bauman ...................... 106/495 |
| 5,368,641 | A | 11/1994 | Dietz et al. ................. 106/495 |
| 5,424,429 | A | 6/1995 | Hendi et al. .................. 546/49 |
| 5,457,203 | A | 10/1995 | Hendi et al. .................. 546/56 |
| 5,472,494 | A | 12/1995 | Hetzenegger et al. ....... 106/493 |
| 5,502,192 | A | 3/1996 | Ganci ............................ 546/49 |
| 5,755,873 | A | 5/1998 | Badejo et al. .............. 106/497 |
| 5,827,364 | A | 10/1998 | Hendi ......................... 106/495 |
| 5,840,901 | A | 11/1998 | Bäbler ........................... 546/49 |
| 5,856,488 | A | 1/1999 | Bäbler ........................... 546/49 |
| 6,013,127 | A | 1/2000 | Bäbler ......................... 106/497 |
| 6,090,196 | A | 7/2000 | Bäbler ......................... 106/497 |
| 6,264,733 | B1 | 7/2001 | Bäbler ......................... 106/495 |
| 6,313,300 | B1 | 11/2001 | Hendi ........................... 546/49 |

FOREIGN PATENT DOCUMENTS

| EP | 0643110 | 3/1995 |
| EP | 1026207 | 8/2000 |
| WO | 02/077104 | 10/2002 |
| WO | 2004007623 | 1/2004 |

OTHER PUBLICATIONS

Ciba Specialty Chemicals Corp. Copending Application No. 10/714,269.
Ciba Specialty Chemicals Corp. Copending Application No. 10/714,270.

*Primary Examiner*—Charanjit S. Aulakh
(74) *Attorney, Agent, or Firm*—Shiela A. Loggins (57) ABSTRACT

The present invention relates to a process for the synthesis of beta-quinacridone by oxidation in the presence of selected additives that promote the formation of the desired crystal phase and particle size.

12 Claims, 2 Drawing Sheets

SYNTHESIS OF SMALL PARTICLE SIZE QUINACRIDONE OF BETA CRYSTAL PHASE

This application claims the benefit of U.S. Provisional Application No. 60/443,257, filed on Jan. 28, 2003 which application is herein incorporated by reference.

This invention describes a direct synthesis of small particle size quinacridone of beta crystal phase using additives during the oxidation of dihydroquinacridone.

Quinacridone pigments are known for their attractive red, magenta, and violet colors and for their outstanding fastness properties. It is well known in the art to prepare quinacridone pigments by oxidizing the correspondingly substituted 6,13-dihydroquinacridone.

For example, numerous publications disclose the oxidation of a 6,13-dihydroquinacridone to the corresponding quinacridone using aromatic nitro compounds as the oxidizing agent in an alcoholic medium containing a base and a small amount of water. However, such processes have the disadvantage of producing considerable organic waste due to the generation of reduced aromatic by-products.

It is also known to oxidize a 6,13-dihydroquinacridone to the corresponding quinacridone by a process wherein the 6,13-dihydroquinacridone is oxidized in a solvent and/or aqueous basic system with an oxygen-containing gas. Such processes are often referred to as "air oxidation" because air is conveniently used as the oxygen-containing gas. Air oxidation processes have the disadvantage that large gas volumes have to be introduced into a heterogeneous reaction mixture, whereby foam is generated. Additionally, it is difficult to determine when the reaction is complete.

Furthermore, it is known to oxidize 6,13-dihydroquinacridones dissolved in polar solvents, for example DMSO, using air as the oxidizing agent. Such processes have the advantage of generating excellent quinacridone pigments in a high yield. However, they have the disadvantage of producing a substantial amount of organic waste, such as dimethylsulfone, as by-product during the oxidation reaction, which requires costly solvent regeneration systems.

The use of hydrogen peroxide as oxidant is known and described as advantageous in that it has a high oxidation efficiency at ambient pressure, is readily available and does not generate a reduced organic by-product. Specific teachings are found in U.S. Pat. No. 5,840,901, U.S. Pat. No. 5,856,488 and U.S. Pat. No. 6,013,127, all of which are incorporated herein by reference.

The hydrogen peroxide oxidation of dihydroquinacridones, as described in U.S. Pat. No. 5,840,901, like other oxidation methods, tends to produce mostly large particle size crude products. Any improvement of this process to produce small particle size pigments would be highly desirable as this would eliminate the need for costly and undesirable finishing processes such as dry milling (U.S. Pat. No. 2,402,167, U.S. Pat. No. 3,030,370 and U.S. Pat. No. 5,084,100) and acid drowning (U.S. Pat. No. 3,326,918, U.S. Pat. No. 3,607,336 U.S. Pat. No. 4,455,173).

It is well known that the unsubstituted quinacridone, depending on the experimental conditions, forms different crystal phases such as alpha, beta and gamma including the gamma-I, gamma-II and gamma-III polytypes. The alpha form is not of interest because of its color properties and instability. The currently commercial and important quinacridones are beta, gamma-I and gamma-II crystal forms.

The use of derivatized pigments as additives in pigmentary quinacridone preparation is well known. Some of the already known quinacridone derivatives are e.g. pyrazolylmethyl quinacridone; phthalimidomethyl quinacridone; quinacridone sulfonic acids; various salts of the quinacridone sulfonic acids and many others. Some of these quinacridone derivatives have been used as pigment particle growth modifiers and some others are used for rheology improvement as described in U.S. Pat. No. 4,455,173, U.S. Pat. Nos. 3,386,843, 4,310,359, and 5,472,494.

The addition of certain quinacridone derivatives in the preparation of quinacridones by the polyphosphoric acid ring-closure route has been reported in U.S. Pat. No. 5,368,641 and U.S. Pat. No. 5,755,873, which disclose the preparation of pigmentary quinacridones, particularly the pigmentary 2,9-dimethylquinacridone. The use of such pigment derivatives in the preparation of pigmentary quinacridones by the oxidation of dihydroquinacridones has been reported in U.S. Pat. Nos. 5,424,429, 5,457,203 and 5,840,901.

U.S. Pat. No. 5,840,901 describes the hydrogen peroxide oxidation of 6,13-dihydroquinacridone, using sodium hydroxide as base in the concentration of 6–10%, preferably 6–7%. The known quinacridone derivatives such as phthalimidomethyl quinacridone, pyrazolylmethyl quinacridone, quinacridone sulfonic acids, as additives, gave only gamma crystal form.

Suprisingly, it has been found that small particle size quinacridones of beta crystal phase can be obtained by the oxidation of a corresponding dihydroquinacridone in the presence of selected additives.

Accordingly the present invention relates to a process for the synthesis of a small particle size quinacridone of beta crystal phase according to formula (II)

comprising oxidizing a corresponding dihydroquinacridone according to formula

(I)

or a salt thereof, in which X and Y, independently of one another, are halogen, —OH, —NO$_2$, —CF$_3$, an C$_1$–C$_4$alkyl group, a substituted C$_1$–C$_4$alkyl group, a C$_1$–C$_4$alkoxy group, a substituted C$_1$–C$_4$alkoxy group, a phenyl group, a cyclohexyl group, a phenoxy group, —COOH, a —COO—C$_1$–C$_4$alkyl group, —SO$_3$H, a phenylamino group, a benzamino group, —N(CH$_3$)$_2$, —SO$_2$NH$_2$, —SO$_2$N(CH$_3$)$_2$, a pyridino group, —CONH$_2$ or —CON(CH$_3$)$_2$, especially F, Cl, Br, I, C$_1$–C$_4$alkyl, or C$_1$–C$_4$alkoxy, and n is 0, 1, or 2, especially 0, or 1, wherein an additive is present during the oxidation reaction according to formula (III)

wherein
M is hydrogen, a quaternary nitrogen cation or a metal cation,
x is 0 to 2,
y is 0.05 to 4, and
Q is a substituted quinacridone residue.

The specific additives control the synthesis of the pigment particles to have a suitable pigmentary size and/or a narrow particle size distribution as well as directing the growth of the crystals to generate quinacridone particles of the beta crystal phase.

A small particle size qinacridone exhibits pigmentary properties, with particle size ranging from 50 nm–800 nm and surface area between 15 $m^2$/g to 100 $m^2$/g.

The dihydroquinacridones and quinacridones to which the invention is applicable are compounds of formulae (I) and (II) respectively,

I

II in which X and Y, independently of one another, are halogen, —OH, —NO$_2$, —CF$_3$, an C$_1$–C$_4$alkyl group, a substituted C$_1$–C$_4$alkyl group, a C$_1$–C$_4$alkoxy group, a substituted C$_1$–C$_4$alkoxy group, a phenyl group, a cyclohexyl group, a phenoxy group, —COOH, a —COO—C$_1$–C$_4$alkyl group, —SO$_3$H, a phenylamino group, a benzamino group, —N(CH$_3$)$_2$, —SO$_2$NH$_2$, —SO$_2$N(CH$_3$)$_2$, a pyridino group, —CONH$_2$ or —CON(CH$_3$)$_2$, and
n is 0, 1, or 2, especially 0, or 1.

Preferably, the dihydroquinacridones and quinacridones to which the invention is applicable are compounds of formulae (I) and (II) respectively Ia IIa in which X and Y, independently of one another, are hydrogen, F, Cl, Br, I, C$_1$–C$_4$alkyl, or C$_1$–C$_4$alkoxy.

In particular the process of the present invention can be used for the production of small particle size quinacridone of beta crystal phase, wherein X and Y of formula 11 are hydrogen.

The additives used are defined by the following structure:

(III)

wherein
M is hydrogen, a quaternary nitrogen cation or a metal cation,
x is 0 to 2, especially x is 0 to 1, and
y is 0.05 to 4, especially y is 0.1 to 2.0,
Q is a substituted quinacridone.

In a preferred embodiment of the present invention Q is selected from 2,9-dichloroquinacridone, 2,9-difluoroquinacridone, 2,9-dibromoquinacridone, 2,9-dimethylquinacridone, 4,11-dichloro quinacridone, 4,11-difluoroquinacridone and 4,11-dimethoxyquinacridone.

M is hydrogen, a quaternary nitrogen cation or a metal cation.

If M is a quaternary nitrogen cation it is, for example, a cation of formula (I)

wherein
R$^{11}$, R$^{12}$, R$^{13}$ and R$^{14}$ are a hydrogen atom, a straight-chain or branched C$_{1-36}$alkyl radical, preferably C$_{1-16}$alkyl radical, which may be unsubstituted or substituted, the total number of carbon atoms in the radicals $R^{11}$, $R^{12}$, $R^{13}$ and $R^{14}$ being in the range from 4 to 36, preferably from 8 to 22, a straight-chain or branched hydroxy-$C_{1-36}$alkyl radical, especially hydroxy-$C_{1-8}$alkyl radical, $C_{6-24}$aryl radical, especially $C_{6-10}$aryl radical, or $C_{7-24}$aralkyl radical, especially $C_{7-12}$aralkyl radical, or two of the radicals $R^{11}$, $R^{12}$, $R^{13}$ and $R^{14}$, together with the nitrogen atom to which they are bonded, form a five-or six-membered heterocyclic ring, such as pyrrolidino, piperidino or morpholino.

Examples of ammonium cations are:
unsubstituted ammonium,
mono-, di-, tri- or tetra-$C_{1-4}$alkylammonium, such as methylammonium, ethylammonium, 3-propylammonium, isopropylammonium, butylammonium, sec-butylammonium, isobutylammonium, 1,2-dimethylpropylammonium or 2-ethylhexylammonium, dimethylammonium, diethylammonium, dipropylammonium, diisopropylammonium, dibutylammonium, diisobutylammonium, di-sec-butylammonium, di-2-ethylhexylammonium, N-methyl-n-butylammonium or N-ethyl-n-butylammonium, trimethylammonium, triethylammonium, tripropylammonium, tributylammonium, N,N-dimethylethylammonium, N,N-dimethylisopropylammonium, N,N-dimethylbenzylammonium or $(CH_3)_2((CH_3O)_2CHCH_2)NH^+$, trimethylcetylammonium (trimethylhexadecylammonium), tributylbenzylammonium, mono-, di-, tri- or tetra-$C_{8-16}$alkylammonium, such as (notional representation of the ammonium cation of Primene 81R®), $C_{1-4}$alkoxy-$C_{1-4}$alkylammonium, such as 2-methoxyethylammonium, bis(2-methoxyethyl)-ammonium, 3-methoxypropylammonium or ethoxypropylammonium, mono-, di- or tri-(hydroxy-$C_{1-4}$alkyl)ammonium, such as mono-, di- or tri-ethanolammonium, mono-, di- or tri-isopropanolammonium, N-methyl- or N,N-dimethyl-ethanolammonium, propanolammonium or isopropanolammonium, N-methyl-diethanolammonium, -dipropanolammonium or -diisopropylammonium, N-ethyl-diethanolammonium, -dipropanolammonium or -diisopropylammonium, N-propyl-diethanolammonium, -dipropanolammonium or -diisopropylammonium.

Polyammonium salts, especially diammonium compounds, are likewise suitable. Preferred diammonium compounds are derived from the following amines: 1,2-diaminoethane, 1,2-diamino-1-methylethane, 1,2-diamino-1,2-dimethylethane, 1,2-diamino-1,1-dimethylethane, 1,2-diaminopropane, 1,3-diaminopropane, 1,3-diamino-2-hydroxypropane, N-methyl-1,2-diaminoethane, 1,4-diazacyclohexane 1,2-diamino-1,1-dimethylethane, 2,3-diaminobutane, 1,4-diaminobutane, N-hydroxyethyl-1,2-diaminoethane, 1-ethyl-1,3-diaminopropane, 2,2-dimethyl-1,3-diaminopropane, 1,5-diaminopentane, 2-methyl-1,5-diaminopentane, 2,3-diamino-2,3-dimethylbutane, N-2-aminoethylmorpholine, 1,6-diaminohexane, 1,6-diamino-2,2,4-trimethylhexane, N,N-dihydroxyethyl-1,2-diaminoethane, N,N-dimethyl-1,2-diaminoethane, 4,9-dioxa-1,12-diaminododecane, 1,2-diaminocyclohexane, 1,3-diamino-4-methylcyclohexane, 1,2-diaminocyclohexane, 1-amino-2-aminomethyl-2-methyl-4,4-dimethylcyclohexane, 1,3-diaminomethylcyclohexane, N-2-aminoethylpiperazine, 1,1-di(4-aminocyclohexyl)methane, 1,1-di(4-aminophenyl)methane, N,N'-diisopropyl-p-phenylenediamine, N,N'-di-sec-butyl-p-phenylenediamine, N,N'-bis(1,4-dimethyl-pentyl)-p-phenylenediamine, N,N'-bis(1-ethyl-3-methyl-pentyl)-p-phenylenediamine, N,N'-bis(1-methyl-heptyl)-p-phenylenediamine, N,N'-dicyclohexyl-p-phenylenediamine, N,N'-diphenyl-p-phenylenediamine, N,N'-di(2-naphthyl)-p-phenylenediamine, N-isopropyl-N'-phenyl-p-phenylenediamine, N-(1,3-dimethyl-butyl)-N'-phenyl-p-phenylenediamine, N-(1-methyl-heptyl)-N'-phenyl-p-phenylenediamine, N-cyclohexyl-N'-phenyl-p-phenylendiamine and N,N'-dimethyl-N,N'-di-sec-butyl-p-phenylenediamine.

Especially preferred examples of M as a quaternary nitrogen cation are ammonium, trimethylcetylammonium, tributylbenzylammonium.

The metal cation includes sodium, potassium, magnesium, calcium, barium or aluminum.

Preferred x and y values are x=0 to 1 and y=0.1 to 2.0.

According to the invention, a $C_{1-36}$alkyl radical is to be understood to mean a straight-chain or branched alkyl radical having from 1 to 36 carbon atoms, especially a $C_{1-6}$alkyl radical, which may be unsubstituted or substituted by one or more $C_{1-4}$alkoxy radicals, for example methyl, ethyl, n-propyl, isopropyl, n-butyl, sec-butyl, isobutyl, tert-butyl, n-pentyl, 2-pentyl, 3-pentyl, 2,2-dimethylpropyl, hexyl, heptyl, 2,4,4-trimethylpentyl, 2-ethylhexyl, octyl or dimethoxymethyl. Examples of a $C_{1-4}$alkoxy radical, which may be linear or branched, are methoxy, ethoxy, n-propoxy, isopropoxy, n-butoxy, sec-butoxy, isobutoxy and tert-butoxy.

The $C_{6-24}$aryl radical is preferably a $C_{6-10}$aryl radical that may be unsubstituted or substituted by $C_{1-4}$alkyl, $C_{1-4}$alkoxy or by hydroxy, for example phenyl, naphthyl, 4-methylphenyl, 4-methoxyphenyl or 2-, 3- or 4-hydroxyphenyl.

Examples of a $C_{7-24}$aralkyl radical, especially a $C_{7-12}$aralkyl radical, which may be unsubstituted or substituted, are benzyl, 2-benzyl-2-propyl, β-phenyl-ethyl, α,α-dimethylbenzyl, ω-phenyl-butyl and ω-phenyl-octyl.

Examples of a straight-chain or branched hydroxy-$C_{1-36}$alkyl radical, especially hydroxy-$C_{1-8}$alkyl radical, are the above examples of a $C_{1-36}$alkyl radical, which are substituted by one, or more hydroxy groups.

The present invention relates to a process for preparing a quinacridone of formula II by the oxidation of a salt of a corresponding 6,13-dihydroquinacridone of formula I in the presence of the selected additives.

In a preferred aspect of the present invention the selected additives are represented by the structure below:

(III)

wherein
M is hydrogen, a quaternary nitrogen cation or a metal cation,
x is 0 to 2, especially x is 0 to 1,
y is 0.05 to 4, especially y is 0.1 to 2, Q is a substituted quinacridone such as 2,9-dichloroquinacridone, 2,9-dimethylquinacridone, 4,11-dicholro quinacridone, 4,11-difluro quinacridone and 4,11-dimethoxyquinacridone.

Preferred examples of M as a quaternary nitrogen cation are ammonium, trimethyl cetyl ammonium, tributylbenzylammonium; the metal cation includes sodium, potassium, magnesium, calcium, barium or aluminum.

Preferred x and y values are, on average as measured in typical compositions used for pigment formation; x is a number from 0 to 1 and y is a number from 0.1 to 2.0.

Preferred examples of such additives are phthalimidomethyl 2,9-dichloroquinacridone, phthalimidomethyl 2,9-dimethyl quinacridone and phthalimidomethyl 4,11-dichloroquinacridone. Preparation of such additives is described in the U.S. Pat. No. 3,275,637. These additives are used in the milling of the pigments to improve the properties such as dispersibility and color strength.

In the present invention the particle growth inhibitor additives, phthalimidomethyl 2,9-dichloro quinacridone, phthalimidomethyl 2,9-dimethyl quinacridone and phthalimidomethyl 4,11-dichloroquinacridone, direct the crystal phase of quinacridone to the beta form, and at the same time reduce the particle size. The additives are used at 1–25% by weight relative to the weight of 6,13-dihydroquinacridone, preferably at 1–10%, and most preferably from 0.05 to 10% by weight based on the 6,13-dihydroquinacridone.

One example of an oxidation process is described in U.S. Pat. No. 5,840,901, which is incorporated herein as reference. The 6,13-dihydroquinacridone salt is prepared, for example, by stirring the 6,13-dihydroquinacridone in a basic medium, for example a basic mixture of water and alcohol, at a temperature above 30° C., preferably 40 to 60° C., and most preferably between 50° C. and the corresponding reflux temperature, for 5 minutes to 2½ hours, preferably 20 minutes to 1½ hours.

The oxidation reaction is carried out in a reaction medium obtained by combining a slurry which consists essentially of a 6,13-dihydroquinacridone, an additive, optionally a base and a suitable liquid phase, with an oxidizing agent. A suitable liquid phase is any liquid media which promotes the oxidation reaction, and which does not react to a significant extent with the oxidizing agent.

A common liquid phase is a mixture of a lower alcohol and water that contains 20 to 750 parts, preferably 40 to 600 parts of water, and 50 to 750 parts, preferably 100 to 600 parts, of alcohol per 100 parts 6,13-dihydroquinacridone; parts being parts by weight. The alcohol is advantageously a $C_1$–$C_4$ lower alcohol, for example, preferably a $C_1$–$C_3$ alkanol, like methanol, ethanol, n-propanol, or iso-propanol, preferably methanol. The reaction medium is preferably substantially free of other organic solvents. However, organic solvents are tolerated in the reaction medium as long as they do not impair the 6,13-dihydroquinacridone salt generation or the oxidation reaction.

Any base capable of forming the salt of the 6,13-dihydroquinacridone is useful in the reaction medium. Preferably, the base is an alkali metal hydroxide, most preferably sodium or potassium hydroxide. In certain instances, it is advantageous to use a mixture of sodium hydroxide and potassium hydroxide. The molar ratio of the base to 6,13-dihydroquinacridone is typically from 1 to 7 moles of base per mole of the 6,13-dihydroquinacridone. Preferably, the reaction medium contains 2.2 to 5 moles of base per mole of the 6,13-dihydroquinacridone.

The generation of the 6,13-dihydroquinacridone salt is observable under the light microscope by the formation of crystals of the 6,13-dihydroquinacridone salt. Depending on the reaction conditions, the kind of base and/or the substituents on 6,13-dihydroquinacridone, the salt is generally in the form of needles, prisms, cubes or platelets.

The oxidation reaction is preferably carried out under an inert gas flow, for example a nitrogen flow.

In one oxidation process, the oxidation is carried out by combining an aqueous solution of hydrogen peroxide as the oxidizing agent with a slurry of the 6,13-dihydroquinacridone in a basic mixture of aqueous alcohol and base over a time interval of from 5 minutes to 6 hours, preferably over 30 minutes to 3½ hours, and subsequently maintaining the reaction medium at an elevated temperature with stirring for a period of time to complete the oxidation and promote pigment recrystallization. The reaction medium is advantageously maintained at a temperature of above 50° C., preferably at reflux temperature for from 5 minutes to 5 hours, preferably 30 minutes to 4 hours, after the addition of the hydrogen peroxide. The pigment is then isolated by filtration, washing with alcohol followed by hot water and drying. The base and the alcohol can be easily regenerated from the filtrate.

The aqueous solution of hydrogen peroxide generally contains from 1 to 50 weight-percent, preferably 5 to 30 weight-percent, and most preferably 10 to 25 weight-percent, of hydrogen peroxide. In general, a small excess of the hydrogen peroxide is used. The molar ratio of hydrogen peroxide to 6,13-dihydroquinacridone is, for example, 1.1 to 5 moles, preferably 1.2 to 3.5 moles, of hydrogen peroxide per mole of the 6,13-dihydroquinacridone.

The oxidation of the 6,13-dihydroquinacridone salt to the corresponding quinacridone by hydrogen peroxide is visually followed by the color change of the reaction mixture.

The presence of an oxidation-promoting amount of the catalyst during the oxidation step leads to a higher yield of quinacridone. Additionally, the presence of the catalyst under the oxidation conditions described above, results in a quinacridone product that is substantially free of quinacridonequinone, for example containing less than 2.5 percent by weight of quinacridonequinone. Minor amounts of quinacridonequinone are tolerated in the final product so long as its presence does not substantially reduce the saturation of the final quinacridone pigment.

Any compound capable of catalyzing the oxidation of 6,13-dihydroquinacridone under the present reaction conditions can be utilized as the catalyst. Particularly suitable catalysts used in the inventive process are, for example, the quinone compounds used for the air oxidation of 6,13-dihydroquinacridone to quinacridone. Such quinone catalysts are well known in the art.

In particular, suitable catalysts include anthraquinone compounds, especially anthraquinone, anthraquinone monosulfonic acid and anthraquinone disulfonic acid, or a salt thereof, especially anthraquinone-2-sulfonic acid or anthraquinone-2,7-disulfonic acid sodium or potassium salt. The quinone catalyst is present in the reaction medium in an amount effective to catalyze the oxidation reaction, for example from 0.005 to 0.1 times the weight of 6,13-dihydroquinacridone, and most preferably 0.01 to 0.05 times the weight of 6,13-dihydroquinacridone.

Depending on the composition of the liquid phase, the recrystallization time and temperature, transparent smaller particle size or opaque larger particle size quinacridone pigments are generated. Lower temperatures and shorter times favor a transparent product, while higher temperatures and longer times favor a more opaque product.

The smaller transparent particle size is defined as having a surface area of from about 15 m$^2$/g to about 100 m$^2$/g. The larger more opaque particle size is defined as being less than about 15 m$^2$/g, especially of from about 7 m$^2$/g to less than about 15 m$^2$/g.

The surface area of the beta crude quinacridone is about 2 to 6 m$^2$/g.

The crystal modification of the quinacridone product can be controlled by adding from about 1 to 10 percent of seed crystals of quinacridone pigment having the desirable crystal modification. The seed crystals are added preferably prior to the oxidation, most preferably prior to salt formation. In the present invention in addition to the additives of formula III, phthalimidomethyl 2,9-dichloro quinacridone, phthalimidomethyl 2,9-dimethyl quinacridone and phthalimidomethyl 4,11-dichloro quinacridone, a second additives, wherein the second additive, is a particle growth inhibitor such as pyrazolylmethyl quinacridone; phthalimidomethyl quinacridone or quinacridone sulfonic acids that can also be added to further reduce the particle size of the beta quinacridone.

Preferably the second additive is selected from the group consisting of pyrazolylmethylquinacridone and quinacridone monosulfonic acid. The second additive is preferably added after the addition of hydrogen peroxide solution. They are more effective once the oxidation is started and the crystal lattice is formed by the first additives by the phthalimidomethyl 2,9-dichloroquinacridone, phthalimidomethyl 2,9-dimethyl quinacridone and phthalimidomethyl 4,11-dichloro quinacridone.

Accordingly, in one aspect of the present invention the oxidation step is carried out by combining a 1 to 50 percent by weight aqueous solution of hydrogen peroxide with a slurry consisting essentially of the 6,13-dihydroquinacridone, a catalyst, a base, and a liquid phase and optionally a polymeric dispersant and a second additive.

The type of oxidation and the use of additives are not limited to the hydrogen peroxide reaction described above. The dihydroquinacridone can alternatively be oxidized to a corresponding quinacridone using aromatic nitro compounds, such as sodium 3-nitrobenzenesulfonate, as the oxidizing agent in an alcoholic medium containing a base and a small amount of water. It is also known to oxidize a dihydroquinacridone to a corresponding quinacridone by a process wherein the 6,13-dihydroquinacridone is oxidized in a solvent and/or aqueous basic system with an oxygen-containing gas. Such processes are often referred to as "air oxidation" because air is conveniently used as the oxygen-containing gas. Furthermore, it is known to oxidize 6,13-dihydroquinacridones dissolved in polar solvents, for example DMSO, using air as the oxidizing agent. The additives mentioned in this invention are also used in the preparation of pigmentary quality 2,9-dichloroquinacridone and solid solutions consisting of substituted and unsubstituted quinacridones. Thus, an aspect of this invention relates to the process wherein a mixture containing two or more 6,13-dihydroquinacridones of formula ((I)) which are co-oxidized by the inventive process to yield a quinacridone solid solution product.

The process of this invention is particularly practical for the preparation of quinacridone- 2,9-dichloroquinacridone, quinacridone-4,11-dichloroquinacridone, quinacridone-2,9-dimethylquinacridone, quinacridone-2,9-dimethoxyquinacridone, 2,9-dichloroquinacridone-2,9-dimethylquinacridone, 2,9-dichloroquinacridone-2,9-dimethoxyquinacridone or 2,9-dimethylquinacridone-2,9-dimethoxyquinacridone solid solution pigments.

The additives mentioned in this invention can also be used in other methods of preparing quinacridones via polyphosphoric acid cyclization described in U.S. Pat. Nos. 5,638,641 and 5,775,873.

The Examples that follow illustrate the invention without limiting the scope thereof. Unless otherwise indicated, percentages and parts are percentages and parts by weight, respectively. The x-ray diffraction patterns are measured on a RIGAKU GEIGERFLEX diffractometer type D/MaxII v BX.

EXAMPLES

Example 1

Comparative

Figure 1:
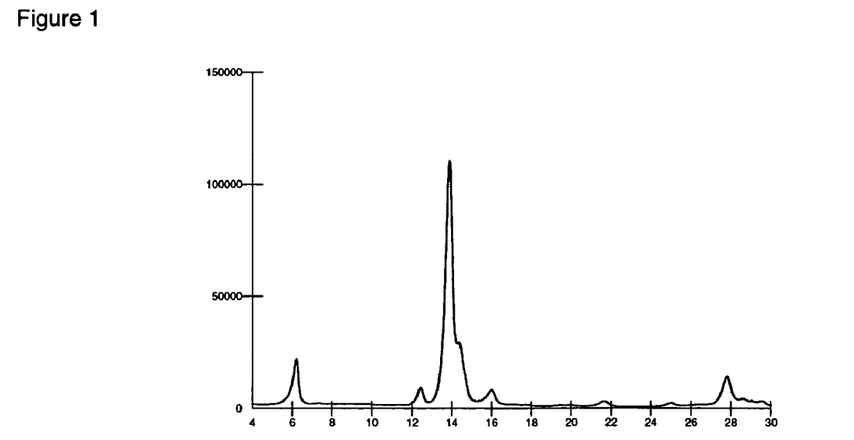
FIG. 1 is an X-ray diffraction pattern for the product of Example 1.

In a 4-neck 1 L round-bottom flask equipped with reflux condenser, mechanical paddle-blade stirrer and a thermocouple element, 6,13-dihydroquinacridone (36 grams, 0.114 mole) is dispersed in methanol (180 ml). A solution of sodium hydroxide (27.4 g, 50% solution in water, 0.343 mole) is added slowly (10 min) using a dropping funnel and the viscous dispersion heated at 55° C. for 1 hour. Sodium anthraquinone monosulfonate (0.5 g) is added and the mixture is heated to reflux. To the resulting mixture, 40 ml of a 16.9% aqueous solution of hydrogen peroxide is added at a rate of 0.15 ml/minute, using a Brinkmann pump. After the addition, the reaction mixture is heated for 10 min, and then 100 ml of water is added. The product is filtered, washed with water (until pH 7.5–8.0) and is then dried in an air oven at 80° C. overnight to give 34.5 g of dark red powder. The product is characterized by X-ray diffraction for relative particle size ($\beta_{1/2}$, values of peaks at 5.5–7 in 2(scale) and crystal structure, by rub-outs (masstone, tint) for colorhistics, and by draw-downs for transparency. The product shows a $\beta_{1/2}$ value of 0.285 at 6.2 2θ, corresponding to alpha-quinacridone (FIG. 1).

Example 2

Figure 2:
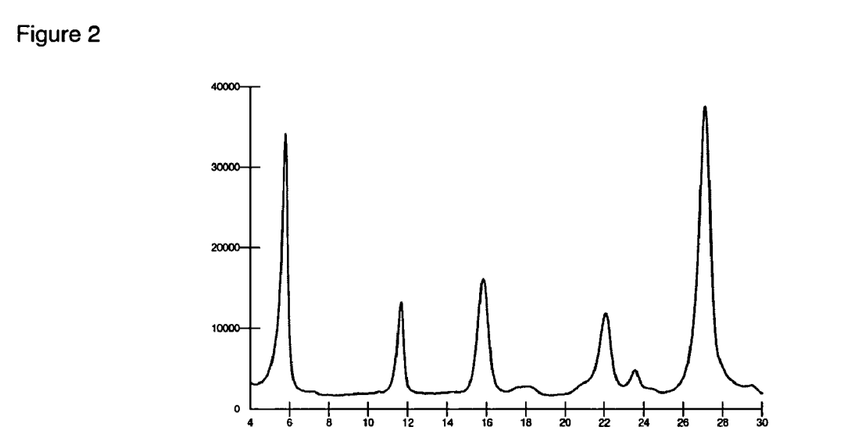
FIG. 2 is an X-ray diffraction pattern for the product of Example 2.

Example 1 is repeated except, the additive phthalimidomethyl 2,9-dichloroquinacridone (1.8 g) is added prior to the addition of sodium anthraquinone monosulfonate. The mixture is heated to reflux followed by the addition of hydrogen peroxide solution and carried out as described in the example 1. The product showed a $\beta_{1/2}$ value of 0.345 at 5.9 2θ, corresponding to beta-quinacridone (FIG. 2). The surface area of the product is 43.1 m$^2$/g. This experiment proves the effect of the additive as the beta phase director as well as the particle size reducing agent.

Example 3

Figure 3:
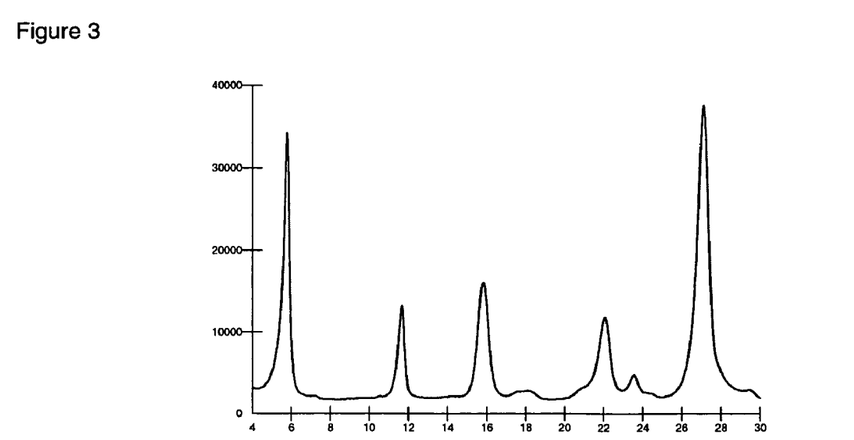
FIG. 3 is an X-ray diffraction pattern for the product of Example 3.

Example 1 is repeated except; the additive phthalimidomethyl 2,9-dichloroquinacridone is added at a higher concentration (3.6 g). The product showed $\beta_{1/2}$ value of 0.409 at 5.9 2θ, corresponding to beta-quinacridone (FIG. 3). The surface area of the product is 61.4 m$^2$/g. This experiment proves the effect of the additive as the beta phase director as well as the particle size reducing agent.

Example 4

Figure 4:
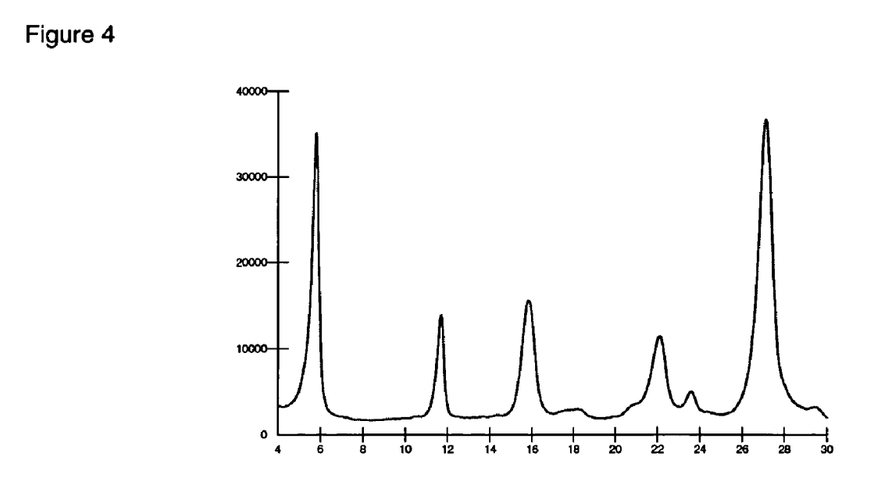
FIG. 4 is an X-ray diffraction pattern for the product of Example 4.

Example 1 is repeated except; the additive phthalimidomethyl 2,9-dimethyl quinacridone (1.8 g) is added prior to the addition of sodium anthraquinone monosulfonate. The mixture is heated to reflux followed by the addition of hydrogen peroxide solution and carried out as described in the example 1. The product showed a $\beta_{1/2}$ value of 0.354 at 5.9 2θ, corresponding to beta-quinacridone (FIG. 4). The surface area of the product is 48.8 m²/g. This experiment proves the effect of the additive as the beta phase director as well as the particle size reducing agent.

Example 5

Figure 5:
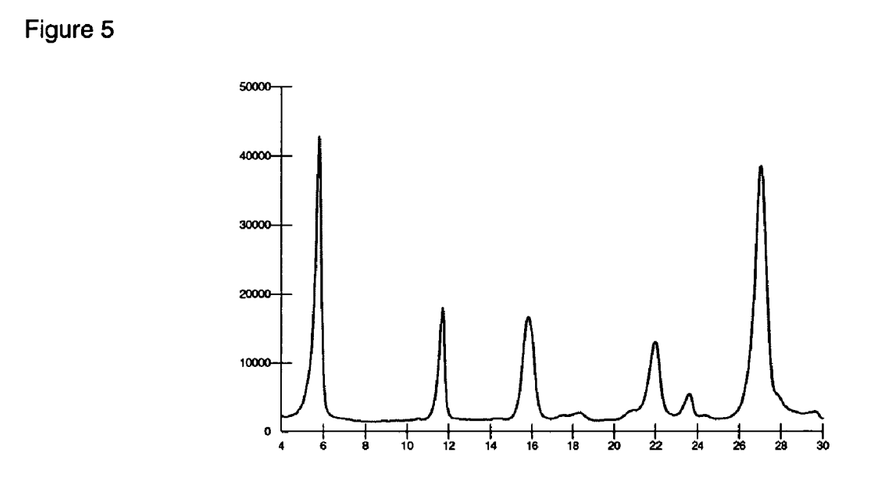
FIG. 5 is an X-ray diffraction pattern for the product of Example 5.

Example 1 is repeated except; the additive phthalimidomethyl 4,11-dichloroquinacridone (1.8 g) is added prior to the addition of sodium anthraquinone monosulfonate. The mixture is heated to reflux followed by the addition of hydrogen peroxide solution and carried out as described in the example 1. The product showed a $\beta_{1/2}$ value of 0.304 at 5.9 2θ, corresponding to beta-quinacridone (FIG. 5). The surface area of the product is 19 m²/g. This experiment proves the effect of the additive as the beta phase director as well as the particle size reducing agent.

Example 6

Comparative

To a one liter four necked round-bottomed flask equipped with a reflux condenser, a mechanical paddle-blade stirrer and a thermocouple element is added 6,13-dihydroquinacridone (50.4 g; 0.162 mole) and dispersed in methanol (180 ml). An aqueous solution of sodium hydroxide (45 g; 0.533 mole; 50%) is added slowly over 10 minutes using a dropping funnel and the viscous dispersion stirred at 55° C. for 1 hour. To this is added sodium anthraquinone monosulfonate (1 g) and the mixture heated to reflux. To the resulting mixture is added an aqueous solution of hydrogen peroxide (45 ml; 0.175 mole; 35%) at a rate of 0.25 ml/minute, using a Brinkmann pump. After the addition, the reaction mixture is stirred at reflux for an additional 10 minutes, and then water (100 ml) is added. The product is filtered, washed with water until pH 7.5–8.0 and then dried in an air oven at 80° C. overnight to give 48 g of a dark brown powder. The product shows a $\beta_{1/2}$ value of 0.260 at 5.9 2θ, corresponding to beta-quinacridone (FIG. 6). The surface area of the product is 2.3 m²/g.

Example 7

Example 6 is repeated except, the additive phthalimidomethyl 2,9-dichloroquinacridone (2 g; as a presscake of 11.9 g) is added prior to the addition of sodium anthraquinone monosulfonate and the reaction is carried out as in the example 5. The product showed a $\beta_{1/2}$ value of 0.343 at 5.9 2θ, corresponding to beta-quinacridone (FIG. 7). The surface area of the product is 37.4 m²/g. This experiment proves the particle size reducing effect of the additive.

Example 8

Example 6 is repeated except, the additive phthalimidomethyl 2,9-dimethyl quinacridone (1 g) is added prior to the addition of sodium anthraquinone monosulfonate and the reaction is carried out as in the example 5. The product showed a $\beta_{1/2}$ value of 0.330 at 5.9 2θ, corresponding to beta-quinacridone (FIG. 8). The surface area of the product is 28.9 m²/g. This experiment proves the particle size reducing effect of the additive.

Example 9

Example 6 is repeated except, the additive phthalimidomethyl 4,11-dichloroquinacridone (1 g) is added prior to the addition of sodium anthraquinone monosulfonate and the reaction is carried out as in the example 5. The product showed a $\beta^{1/2}$ value of 0.305 at 5.9 2θ, corresponding to beta-quinacridone (FIG. 9). The surface area of the product is 8.4 m²/g. This experiment proves the particle size reducing effect of the additive, but less effectively.

Example 10

Comparative

To a one liter four necked round-bottomed flask equipped with a reflux condenser, a mechanical paddle-blade stirrer and a thermocouple element is added 6,13-dihydroquinacridone (40 g; 0.129 mole) and dispersed in methanol (210 ml). An aqueous solution of sodium hydroxide (53 g; 0.66 mole; 50%) is added slowly over 10 minutes using a dropping funnel and the viscous dispersion stirred at 55° C. for 1 hour. To this is added slowly a solution of sodium 3-nitrobenzenesulfonate (24 g in 27 ml of water) then heated and the reaction mixture is stirred at reflux for 2 hours, and then water (100 ml) is added. The product is filtered, washed with water until pH 7.5–8.0 and then dried in an air oven at 80° C. overnight to give 38 g of a dark brown powder. The product shows a $\beta_{1/2}$ value of 0.251 at 5.8 2θ, corresponding to beta-quinacridone (FIG. 10). The surface area of the product is 5.5 m²/g.

Example 11

Example 10 is repeated except, the additive phthalimidomethyl 2,9-dichloroquinacridone (2 g) is added prior to the addition of sodium 3-nitrobenzenesulfonate and the reaction is carried out as in the example 10. The product showed a $\beta_{1/2}$ value of 0.368 at 5.9 2θ, corresponding to beta-quinacridone (FIG. 11). The surface area of the product is 45.4 m²/g. This experiment proves the particle size reducing effect of the additive under a different oxidation condition where sodium anthraquinone monosulfonate is used as oxidant instead of hydrogen peroxide.

Example 12

Comparative

In a 4-neck 1 L round-bottom flask equipped with reflux condenser, mechanical paddle-blade stirrer and a thermocouple element, 6,13-dihydroquinacridone (36 grams, 0.114 mole) is dispersed in methanol (178 ml). A solution of sodium hydroxide (53.0 g, 50% solution in water, 0.662 mole) is added slowly, followed by addition of water (15.6 g). The viscous dispersion is heated to 50° C. for 1 hour. A solution of sodium anthraquinone-2,7-disulfonate (1.0 g) in water (23 g) is added, and the mixture is heated to reflux for 0.5 hour. To the resulting mixture, 30 g of a 20% aqueous solution of hydrogen peroxide is added at a rate of 0.3 ml/min, using a Brinkmann pump. After the addition, the reaction mixture is heated for 15 minutes, and cooled to room temperature. The product is filtered, washed with water (until pH 7.0–8.0) and is then dried in an air oven at 80° C. overnight to give 27.9 g of dark red powder. The product is characterized by X-ray diffraction for relative particle size, which shows a $\beta_{1/2}$ value of 0.253 at 5.60, corresponding to beta-quinacridone crude. Surface area is 2.1 m²/g.

Example 13

Example 12 is repeated except, the additive phthalimidomethyl 2,9-dichloroquinacridone (1.44 g) is added to 6,13-dihydroquinacridone after the addition of sodium hydroxide solution, and the reaction is carried out as in the example 12. The product is characterized by X-ray diffraction for relative particle size, by rub-outs (masstone, tint) for coloristics, and by draw-downs for transparency. The product shows a $\beta_{1/2}$ value of 0.353 at 5.60, corresponding to beta-quinacridone. Surface area is 41.2 m²/g Example 14

Example 13 is repeated except, pyrazolylmethyl-quinacridone (0.72 g) is added after 0.5 hours of the addition of hydrogen peroxide solution, and carried out as described in the example 1. The product shows a $\beta_{1/2}$ value of 0.387 at 5.750, corresponding to a small particle size beta-quinacridone (FIG. 12). Surface area is about 30 to 50 m²/g.

Example 15

Example 13 is repeated except, quinacridone monosulfonic acid (0.72 g) is added after 0.5 hours of the addition of hydrogen peroxide solution, and carried out as described in the example 1. The product shows a $\beta_{1/2}$ value of 0.417 at 5.850, corresponding to a small particle size beta-quinacridone. Surface area is about 30 to 50 m²/g.

Surface Area for Beta-Quinacridone Examples 1–15

| Example | Crystal Phase[additive] | Surface Area m²/g |
|---|---|---|
| 1 (V) | Alpha | NA |
| 2 | beta[1] | 43.1 |
| 3 | beta[1] | 61.4 |
| 4 | beta[2] | 48.8 |
| 5 | beta[3] | 19.0 |
| 6 (V) | Beta | 2.3 |
| 7 | beta[1] | 37.4 |
| 8 | beta[2] | 28.9 |
| 9 | beta[3] | 8.4 |
| 10 (V) | Beta | 5.5 |
| 11 | beta[1] | 45.4 |
| 12 (V) | Beta | 2.1 |
| 13 | beta[1] | 41.5 |
| 14 | beta[4] | 30 to 50 |
| 15 | Beta[5] | 30 to 50 |

[1] phthalimidomethyl 2,9-dichloro QA
[2] phthalimidomethyl 2,9-dimethyl QA
[3] phthalimidomethyl 4,11-dichloro QA
[4] phthalimidomethyl 2,9-dichloro QA + pyrazolylmethyl-quinacridone
[5] phthalimidomethyl 2,9-dichloro QA + quinacridone monosulfonic acid

What is claimed is:

1. A process for the synthesis of a small particle size quinacridone of beta crystal phase according to formula comprising oxidizing a corresponding dihydroquinacridone according to formula (I)

or a salt thereof, in which X and Y, independently of one another, are halogen, —OH, —NO₂, —CF₃, an $C_1$–$C_4$alkyl group, a substituted $C_1$–$C_4$alkyl group, a $C_1$–$C_4$alkoxy group, a substituted $C_1$–$C_4$alkoxy group, a phenyl group, a cyclohexyl group, a phenoxy group, —COOH, a —COO—$C_1$–$C_4$alkyl group, —SO₃H, a phenylamino group, a benzamino group, —N(CH₃)₂, —SO₂NH₂, —SO₂N(CH₃)₂, a pyridino group, —CONH₂ or —CON(CH₃)₂, and n is 0, 1, or 2, wherein an additive is present during the oxidation reaction according to formula wherein M is hydrogen, a quaternary nitrogen cation or a metal cation, x is 0 to 2, y is 0.05 to 4, and Q is a substituted quinacridone residue.

2. A process according to claim 1, wherein Q is selected from the group consisting of 2,9-dichloroquinacridone, 2,9-dimethylquinacridone, 4,11-dichloroquinacridone, 4,11-difluoroquinacridone and 4,11-dimethoxyquinacridone.

3. A process according to claim 1, wherein n=0.

4. A process according to claim 1, wherein M is a quaternary nitrogen cation selected from the group consisting of ammonium, trimethylcetylammonium and tributylbenzylammonium, or M is a metal cation which is selected from the group consisting of sodium, potassium, magnesium, calcium, barium and aluminum.

5. A process of claim 1, wherein the oxidation step is carried out by combining a slurry consisting essentially of the 6,13-dihydroquinacridone salt, a catalyst, a base, and a liquid phase, with an aqueous solution of hydrogen peroxide.

6. A process of claim 5, wherein the liquid phase consists essentially of from about 20 to 750 parts by weight of water and from about 50 to 750 parts by weight of a $C_1$–$C_4$ alcohol.

7. A process of claim 5, wherein the 6,13-dihydroquinacridone salt is a di-sodium or di-potassium salt.

8. A process of claim 5, wherein the base is an alkali metal hydroxide which is present in an amount of from 1 to 7 moles.

9. A process of claim 5, wherein the catalyst is selected from the group consisting of anthraquinone, anthraquinone monosulfonic acid and anthraquinone disulfonic acid, or a salt thereof.

10. A process of claim 9, wherein the catalyst is present in an amount of from 0.005 to 0.1 times the weight of the 6,13-dihydroquinacridone.

11. A process of claim 9, wherein the oxidation step is carried out by combining a 1 to 50 percent by weight aqueous solution of hydrogen peroxide with a slurry consisting essentially of the 6,13-dihydroquinacridone, a catalyst, a base, a compound of formula III, a liquid phase and further comprising a second additive, wherein the second additive is a particle growth inhibitor.

12. A process of claim 11, wherein the particle growth inhibitor is selected from the group consisting of pyrazolylmethyl-quinacridone and quinacridone monosulfonic acid.

* * * * *